J. GREEN.
PLOW.
APPLICATION FILED JAN. 20, 1911.

1,012,254.

Patented Dec. 19, 1911.
3 SHEETS—SHEET 1.

Witnesses
H. A. Stock
H. C. Schroeder

Inventor
John Green
By E. E. Vrooman
Attorney.

J. GREEN.
PLOW.
APPLICATION FILED JAN. 20, 1911.

1,012,254.　　　　　　　　　　　　　　　Patented Dec. 19, 1911.
3 SHEETS—SHEET 3.

Witnesses
H. A. Stock.
H. A. Schroeder.

Inventor
John Green
By E. E. Vrooman,
Attorney

UNITED STATES PATENT OFFICE.

JOHN GREEN, OF OAKLAND, CALIFORNIA, ASSIGNOR OF ONE-HALF TO MELVIN GREEN, OF OAKLAND, CALIFORNIA, AND ONE-HALF TO MAUD GREEN, OF TURLOCK, CALIFORNIA.

PLOW.

1,012,254.   Specification of Letters Patent.   Patented Dec. 19, 1911.

Application filed January 20, 1911. Serial No. 603,747.

*To all whom it may concern:*

Be it known that I, JOHN GREEN, a citizen of the United States, residing at Oakland, in the county of Alameda and State of California, have invented certain new and useful Improvements in Plows, of which the following is a specification.

This invention relates to agricultural machines of the motor propelled type and the principal object of the same is to provide a plow or harrow in which the propelling motor operates the earth pulverizers and also to provide novel means whereby the speed of the machine relative to the speed of the pulverizers may be varied to compensate for the nature of the soil that is being operated upon.

With the above generally stated objects of the invention in view, it is contemplated providing a rotary plow or harrow which can be readily controlled by one person, and in which the soil cutting mechanism can be readily adjusted without stopping the machine, and said soil cutting mechanism including novel types of knives which are adapted for use in connection with various kinds of soil and are relatively arranged so that the soil is quickly placed in the proper condition for planting.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1:
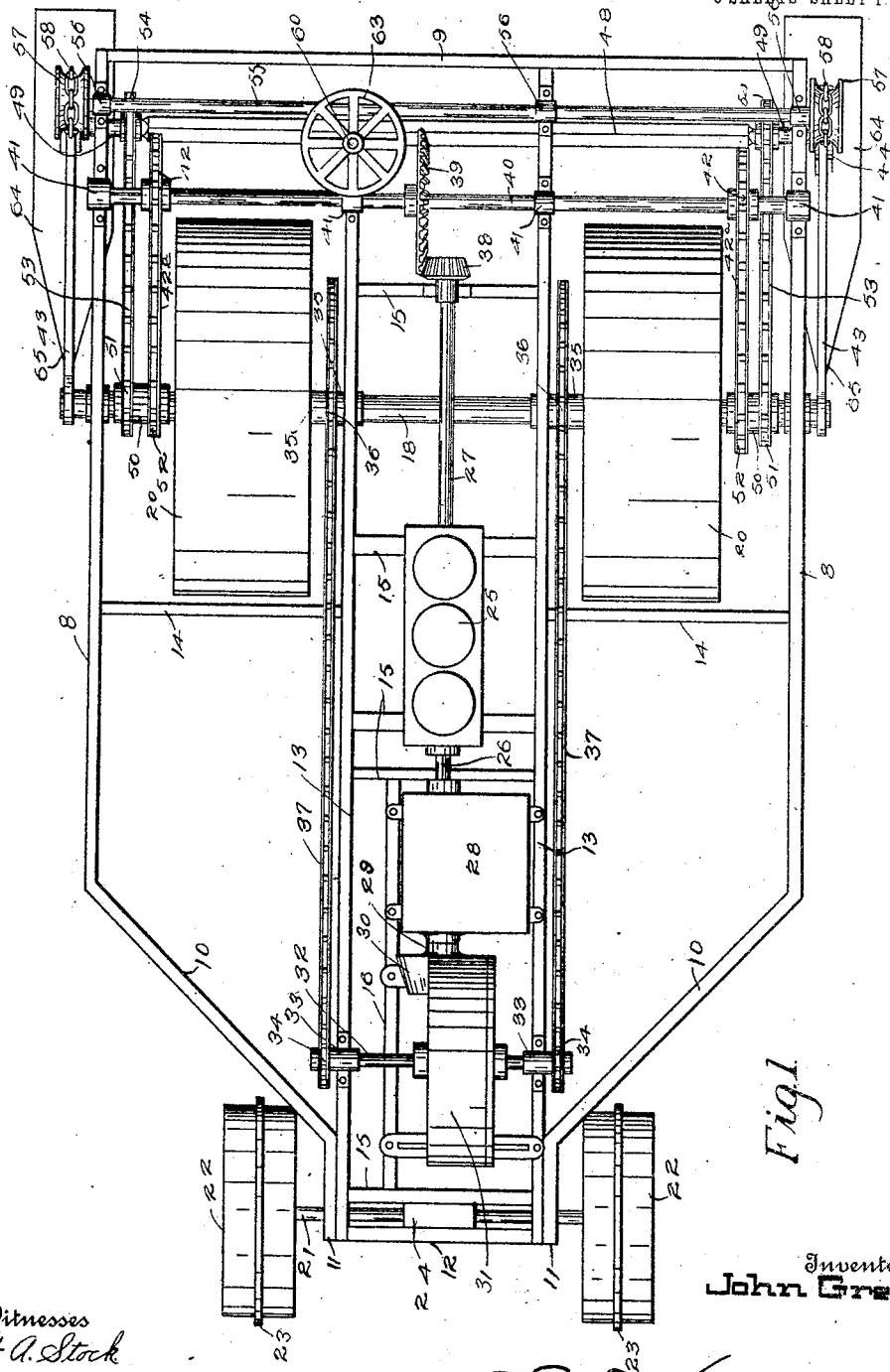
Figure 2:
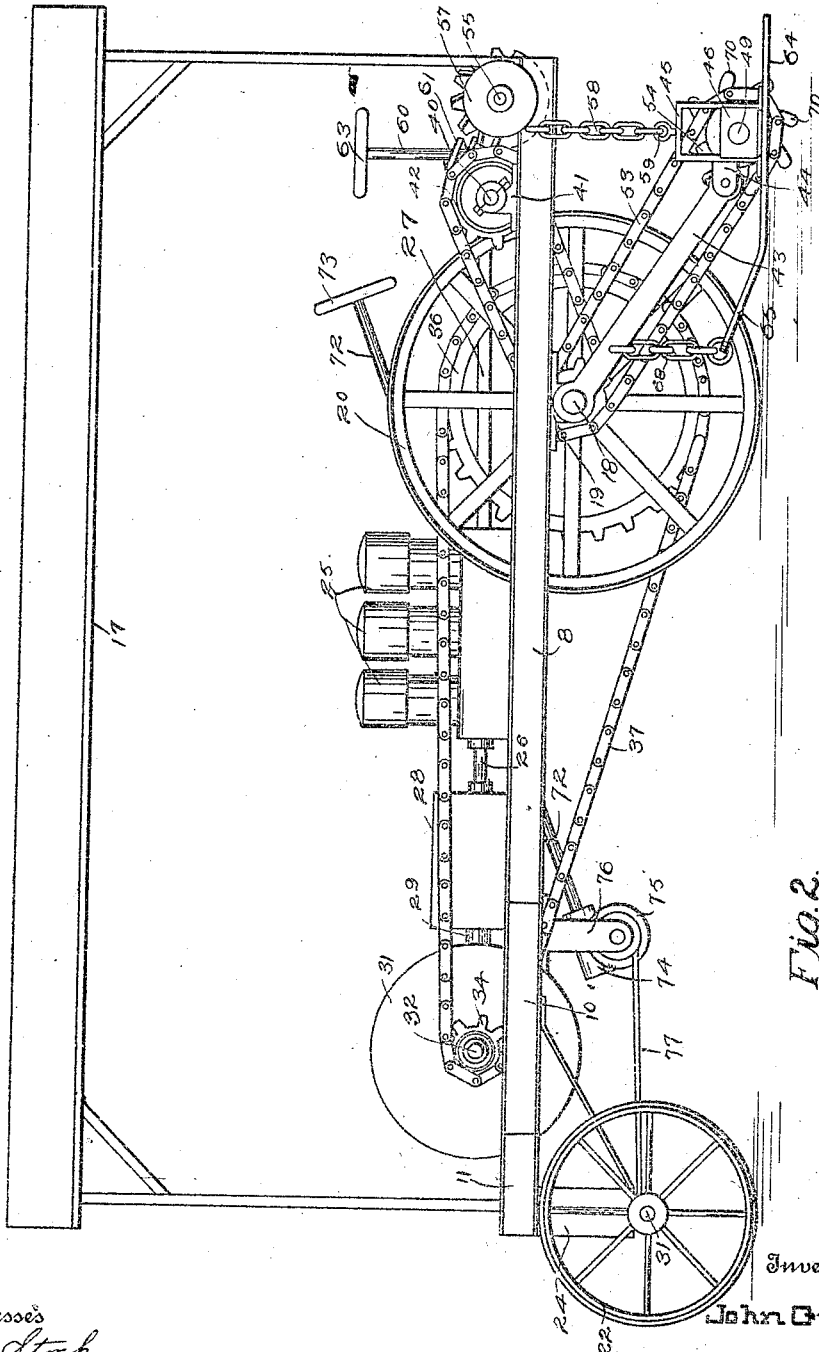
Figure 3:
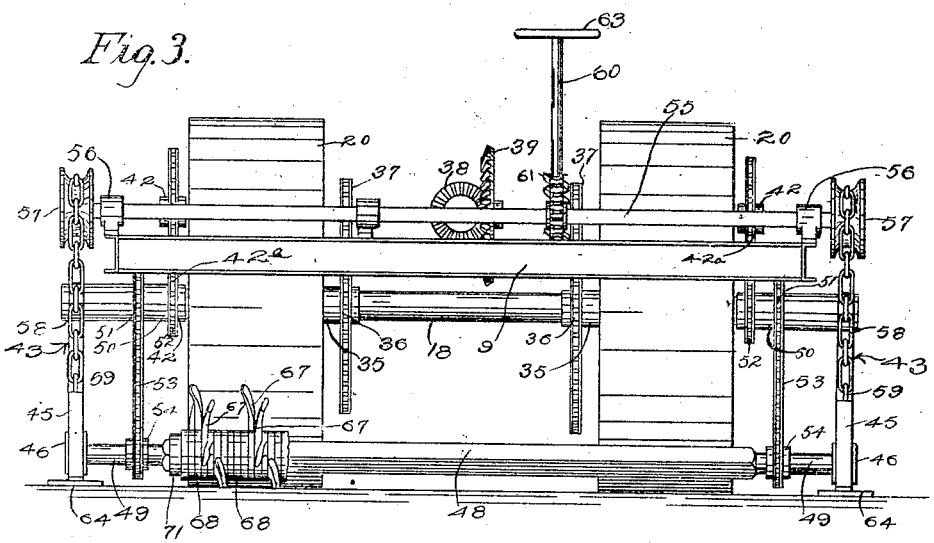
Figure 5:
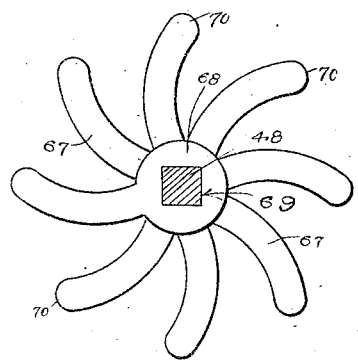
Figure 4:
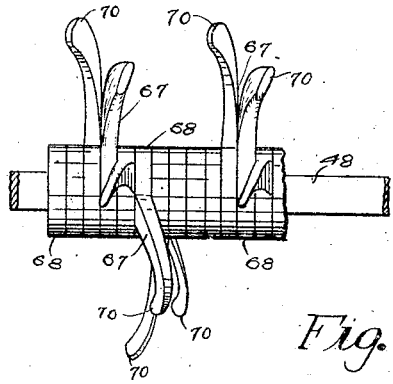
Figure 6:

Figure 1 is a top plan view of the improved agricultural machine, the steering gear and the canopy being omitted. Fig. 2 is a view in side elevation of a complete machine constructed in accordance with this invention. Fig. 3 is a view in rear elevation of the structure shown in Fig. 1. Fig. 4 is a fragmentary view in elevation of the plow shaft and knives carried thereby. Fig. 5 is an end view thereof. Fig. 6 is a detail view of one of the knives.

Referring to the accompanying drawings by numerals, it will be seen that the improved agricultural machine comprises a horizontally arranged supporting frame that is preferably formed of the outer parallel bars 8 which have their rear ends connected by the rear bar 9. The forward portions 10 of bars 8 converge and terminate in the parallel bars 11 which have their outer ends connected by the bar 12. Inner bars 13, arranged in spaced parallel relation, extend from the front bar 12, between the bars 11, to the rear bar 9. At intermediate points, the bars 8 are connected to the bars 13 by the braces 14, and said bars 13 are connected by the transverse bars 15, the forward set of bars 15 being connected by a longitudinal bar 16. Preferably the supporting frame is provided with a canopy 17.

A rear axle 18 is mounted in hangers 19 carried by the rear of the supporting frame, and wheels 20 are rotatably mounted thereon. Said wheels are provided with broad tread surfaces so that said wheels will not sink into the ground. An axle 21 is provided for the front of the frame and has the steering wheels 22 mounted thereon. Said wheels 22 are provided with wide tread surfaces and also with a peripheral rib 23 to prevent slipping. The axle 21 is pivotally connected to the usual front bolster 24.

A motor 25, preferably of the internal combustion type is carried by one set of the transverse braces 15. The shaft of motor 25 has a forwardly projecting portion 26 and a rearwardly projecting portion 27. The forward portion 26 of the motor shaft engages suitable speed changing mechanism in a casing 28, and from said mechanism a shaft 29 projects. Shaft 29 is equipped with a gear 30 that engages a differential gear 31 that is mounted on a shaft 32. Shaft 32 is mounted in bearings 33 carried by the forward portions of bars 13 and its projecting ends have sprockets 34 fast thereon. The hubs 35 of rear wheels 20 have sprockets 36 fast thereon and said sprockets are connected to the sprockets 34 by the chains 37. By the described arrangement of gearing, shafting and sprocket connections, it will be clear that the motor 25 drives the wheels 20 and that the speed of the machine can be regulated by means of the speed changer without affecting the operation of said motor.

The rearwardly projecting portion 27 of the motor shaft carries a gear 38 fast on its rear end that is in mesh with a gear 39 fast on a shaft 40 that extends transversely of the rear of the supporting frame and is mounted in bearings 41 carried by said frame. Adjacent its ends, shaft 40 has sprockets 42 fast thereon.

The rear axle 18 has arms 43 pivotally mounted on its ends. Said arms are elongated and project rearwardly and their outer ends are pivotally connected to ears 44 projecting laterally from substantially rectangular housings 45 in which bearings 46 are mounted. A squared shaft 48 has its rounded ends 49 journaled in the bearings 46.

Sleeves 50 are loose on the end portions of axle 18 within the supporting frame, said sleeves having sprockets 51 and 52 fast thereon. Sprockets 52 have chain connections 42$^a$ with sprockets 42 and sprockets 51 have chain connections 53 with sprockets 54 fast on the rounded portion of shaft 48. Shaft 48 is the plow shaft, as will be more fully described, and it will be clear from the foregoing that the same is rotated by power taken from the motor shaft and transmitted through shaft 40, sleeves 50 and sprockets 51 and 54 and chains 53.

A winding shaft 55 extends transversely of the rear of the supporting frame and is journaled in bearings 56 carried by said frame. Shaft 55 is arranged in spaced parallel relation to transmission shaft 40 and its projected ends carry drums 57 upon which chains 58 or other flexible supports are wound. Chains 58 connect with eyes 59 carried by the upper portions of housings 45. A vertically arranged shaft 60 is suitably journaled in the rear of the supporting frame and carries a worm 61 that is in mesh with a worm wheel 62 fast on winding shaft 55. A hand wheel 63 is carried by the upper end of shaft 60 to facilitate rotation of said shaft so that shaft 55 will be rotated to wind or unwind chains 58 and thereby vertically adjust plow shaft 48.

Flat elongated shoes or runners 64 are arranged beneath the housings 45 to prevent said housing sinking into the soil, said shoes being provided with upwardly inclined front end portions 65 which have chains or other flexible connections 66 with the arms 43.

A plurality of knives 67 are provided for the shaft 48, said knives having their hubs 68 provided with squared openings 69 which snugly fit the squared portion of said shaft. The knives curve outwardly and their free ends 70 are flattened and twisted, as is clearly shown in Figs. 4 and 6. The knives are arranged in staggered and flaring relation on the shaft 48 and are rigidly held thereon in abutting relation by the collars 71. As is clearly shown in Fig. 4, each knife is composed of a blade and a hub which are integral so that in the event of one or more knives being damaged, the same can be readily removed and a new knife substituted.

As will be understood from the foregoing, the rear portion of the motor shaft drives the plow or harrow and the forward portion of said shaft drives the propelling mechanism of the machine and that by means of the speed changer 28, the speed of the machine can be readily controlled without affecting the operation of the plow. This feature is advantageous for the reason that some soils, such as clay, or other heavy soils slow speed of the machine is necessary to secure a thorough pulverizing, while on light soils, such as sandy soils, the same result can be obtained by running the machine at a high speed.

An inclined steering shaft 72 has its rear end adjacent the hand wheel of the shaft 60, said shaft 72 being equipped with a hand wheel 73. Shaft 72 is suitably journaled in the supporting frame and its forward end has a gear connection 74 with the winding drums 75 that are journaled in the hangers 76. Said drums having cable connections 77 with the front axle 21. The arrangement of the shafts 60 and 72 permits the operator stationed on the rear of the supporting frame to both steer the machine and adjust the plow, so that the entire operation of the machine can be performed by one attendant.

As will be obvious, the plow being pivotally connected to the rear axle by the arms 43, said plow can be vertically adjusted to govern the depth of cut of the knives 67 or to entirely raise the plow from the soil when the use of the same is not desired.

What I claim as my invention is:—

1. An agricultural machine comprising a frame, a rear axle carried thereby, propelling wheels carried by said axle, a front axle carried by the frame, steering wheels carried thereby, supporting arms pivotally connected to the rear axle, a winding shaft carried by said frame, drums carried by said winding shaft, housings pivotally connected to said arms, adjusting connections between said housings and said drums, bearings in said housing, a rotary plow journaled in said bearings, shoes beneath said housings, means for flexibly connecting said shoes to said arms, and a motor carried by said frame for operating the propelling wheels and the rotary plow.

2. An agricultural machine comprising a frame, supporting arms pivotally connected thereto and projecting rearwardly, housings pivotally connected to said arms, shoes beneath said housings, means for flexibly connecting said shoes to said arms, means carried by said frame for vertically adjusting said housings, a rotary plow journaled in said housings, and means for operating said plow.

3. A plow comprising a portable carrier, arms pivotally connected thereto, housings pivotally connected to said arms, means for vertically adjusting said housings, a rotary plow journaled in said housings, shoes for preventing said plow unduly sinking in the ground, means for flexibly connecting said shoes to said arms, and common means for driving the carrier and rotating said plow.

4. A plow comprising a portable carrier, supporting arms pivotally connected to the rear end thereof, a rotary plow pivotally connected to said arms, means for vertically adjusting said plow, shoes for preventing said plow unduly sinking in the ground, and means for flexibly connecting said shoes to said arms.

5. A plow comprising a portable carrier, supporting arms pivotally connected to the rear thereof, bearing housings pivotally connected to the outer ends of said arms, a rotary plow carried by said housings, means on said carrier for vertically adjusting said housings, shoes carried by the bottoms of said housings, flexible connections between said shoes and said arms, and a motor for rotating said plow and propelling said carrier.

In testimony whereof I affix my signature in presence of two witnesses.

JOHN GREEN.

Witnesses:
H. C. SCHROEDER,
F. P. SCHROEDER.